(12) United States Patent
Cerato

(10) Patent No.: US 11,535,999 B2
(45) Date of Patent: Dec. 27, 2022

(54) HELICAL PILES WITH SENSORS AND DATA ACQUISITION UNIT

(71) Applicant: The Board of Regents of the University of Oklahoma, Norman, OK (US)

(72) Inventor: Amy Cerato, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 16/876,384

(22) Filed: May 18, 2020

(65) Prior Publication Data

US 2020/0370264 A1    Nov. 26, 2020

Related U.S. Application Data

(60) Provisional application No. 62/850,045, filed on May 20, 2019.

(51) Int. Cl.
*E02D 5/56* (2006.01)
*E02D 5/48* (2006.01)
*G01D 21/02* (2006.01)

(52) U.S. Cl.
CPC .............. *E02D 5/48* (2013.01); *G01D 21/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,904,447 A | * | 5/1999 | Sutton | E02D 3/10 405/263 |
| 5,978,749 A | * | 11/1999 | Likins, Jr. | E02D 13/00 700/108 |
| 6,238,142 B1 | * | 5/2001 | Harsch | E02D 5/36 175/48 |
| 6,301,551 B1 | * | 10/2001 | Piscalko | E02D 13/06 340/853.8 |
| 6,533,502 B2 | * | 3/2003 | McVay | E02D 13/06 340/853.8 |

(Continued)

OTHER PUBLICATIONS

Bica, Adriano et al.; "Instrumentation and Axial Load Testing of Displacement piles"; Feb. 20, 2013; All (Year: 2013).*

(Continued)

*Primary Examiner* — Benjamin F Fiorello
(74) *Attorney, Agent, or Firm* — Crowe & Dunlevy, P.C.

(57) ABSTRACT

A pile for use in a ground pile system has a tubular body and one or more sensor modules attached to the tubular body. Each of the one of more sensor modules includes a sensor guard that has a perimeter and a sensor nested within the sensor guard. The sensor is recessed within the perimeter of the sensor guard to protect the sensor during installation of the pile. A data acquisition unit can be used to receive data from the one or more sensor modules. The data acquisition unit includes a solar panel array, a battery charged by the solar panel array, a modem powered by the battery, and a computer powered by the battery. The computer is configured to receive signals from the sensors and transmit the signals to a remote operation center through the modem.

16 Claims, 4 Drawing Sheets

(56) References Cited

U.S. PATENT DOCUMENTS

| | | | | |
|---|---|---|---|---|
| 6,985,831 | B2* | 1/2006 | Ito | G01D 9/005 |
| | | | | 702/188 |
| 8,612,175 | B2* | 12/2013 | Dalton | G01B 21/18 |
| | | | | 702/166 |
| 10,934,678 | B2* | 3/2021 | Dekle | E02D 5/46 |
| 2005/0100415 | A1* | 5/2005 | Larovere | E02D 13/06 |
| | | | | 405/232 |
| 2011/0283640 | A1* | 11/2011 | Miller | E04H 12/10 |
| | | | | 52/292 |
| 2013/0255169 | A1* | 10/2013 | Henderson | E02D 27/42 |
| | | | | 52/223.13 |
| 2014/0193208 | A1* | 7/2014 | McILravey | F16C 11/04 |
| | | | | 405/232 |
| 2014/0356075 | A1* | 12/2014 | Hale | E02D 7/02 |
| | | | | 405/230 |
| 2014/0356076 | A1* | 12/2014 | Hale | E02D 5/54 |
| | | | | 405/255 |
| 2016/0047107 | A1* | 2/2016 | Shin | E02D 27/10 |
| | | | | 405/227 |
| 2016/0108598 | A1* | 4/2016 | Waxse | E02D 7/06 |
| | | | | 173/46 |
| 2019/0218738 | A1* | 7/2019 | Chang | E02D 27/16 |
| 2020/0116006 | A1* | 4/2020 | Cardona | E21B 47/024 |
| 2020/0149241 | A1* | 5/2020 | Flanigan | E02D 13/00 |

OTHER PUBLICATIONS

Han; Fei et al.; "Validation of Pile Design Methods for Closed-Ended Driven Pipe Piles"; Mar. 2019; All (Year: 2019).*

Buhler and Cerato, Design of Dynamically Wind-Loaded Helical Piers for Small Wind Turbines, Journal of Performance of Constructed Facilities, Aug. 2010.

Cerato and Victor, Effects of Long-Term Dynamic Loading and Fluctuating Water Table on Helical Anchor Performance for Small Wind Tower Foundations, Journal of Performance of Constructed Facilities, Aug. 2009.

Derato and Victor, Effects of Helical Anchor Geometry on Long-Term Performance of Small Wind Tower Foundations Subject to Dynamic Loads, DFI Journal, Nov. 2008.

Victor and Cerato, Helical Anchors as Wind Tower Guyed Cable Foundations, Foundations: Proceedings of teh Second BGA International Conference on Foundations, ICOF2008, 2008.

* cited by examiner

HELICAL PILES WITH SENSORS AND DATA ACQUISITION UNIT

RELATED APPLICATIONS

The present application claims the benefit of U.S. Provisional Patent Application Ser. No. 62/850,045 filed May 20, 2019 entitled, "Helical Piles with Sensors and Data Acquisition Unit," the disclosure of which is herein incorporated by reference.

BACKGROUND

Piles, piers and caissons are commonly used to support wind generators, telecommunications towers and other elevated structures. These structures are often stabilized against lateral loading by guy wires, but can also be configured as self-supporting towers. Often, piles are driven into the ground and used as anchor points for these towers. To ensure the stability of the towers, the piles must be installed to the proper depth and geologic strata. In many cases, piles are fitted with helical flights that facilitate the installation of the pile, providing simultaneous axial tension and compression resistance underneath the tower and additional resistance against an unintentional pullout on a guyed anchor due to the application of vertical tension on the pile.

Once installed, piles, piers and other earth anchors are subjected to several artificial and natural forces. Artificial loading may result from the attached guy wires. Earthquakes, wind, groundwater and shifting geologic strata may produce natural loading. These forces may apply torsional, lateral, axial (both tensional and compressive), and compound loading on the pile or pier. In certain situations, these forces may compromise the ability of the pile or pier to perform the intended supportive function. For example, if a helical pile is loosened from its anchor within the earth, the application of a strong axial load may cause the pile to be partially removed from the anchored position, which may in turn produce slack and unwanted movement on the connected guy wires and guyed structure.

There is, therefore, a need for a system that is capable of detecting and reporting the application of forces to the pile. The present disclosure is directed to addressing these and other deficiencies in the prior art.

WRITTEN DESCRIPTION

In one aspect, embodiments of the present invention include a pile for use in a ground pile system has a tubular body and one or more sensor modules attached to the tubular body. Each of the one of more sensor modules includes a sensor guard that has a perimeter and a sensor nested within the sensor guard. The sensor is recessed within the perimeter of the sensor guard to protect the sensor during installation of the pile. A data acquisition unit can be used to receive data from the one or more sensor modules. The data acquisition unit includes a solar panel array, a battery charged by the solar panel array, a modem powered by the battery, and a computer powered by the battery. The computer is configured to receive signals from the sensors and transmit the signals to a remote operation center through the modem.

Figure 1:
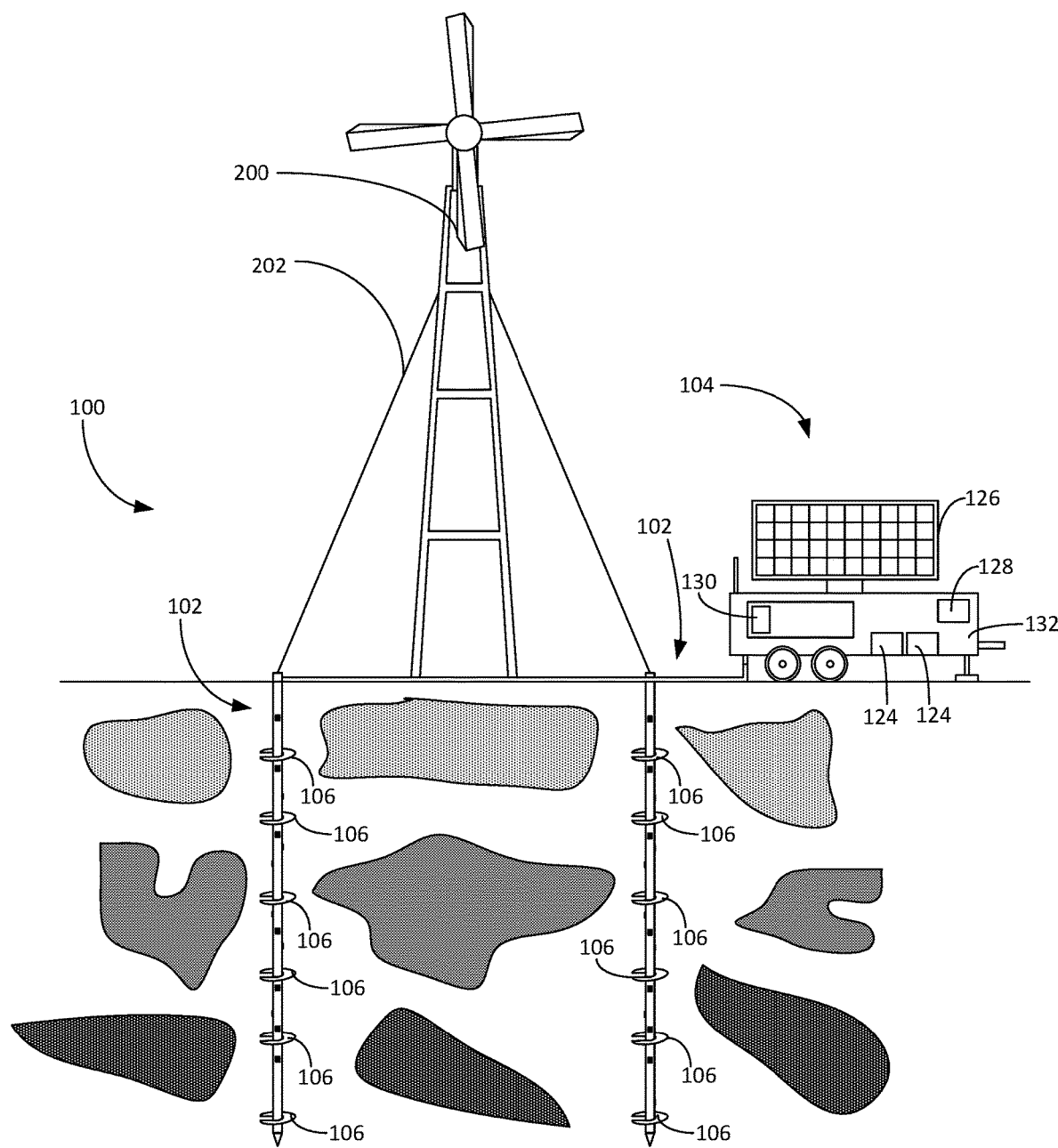
FIG. 1 depicts a guyed tower supported by a plurality of helical piles constructed in accordance with an exemplary embodiment.
Figure 6:
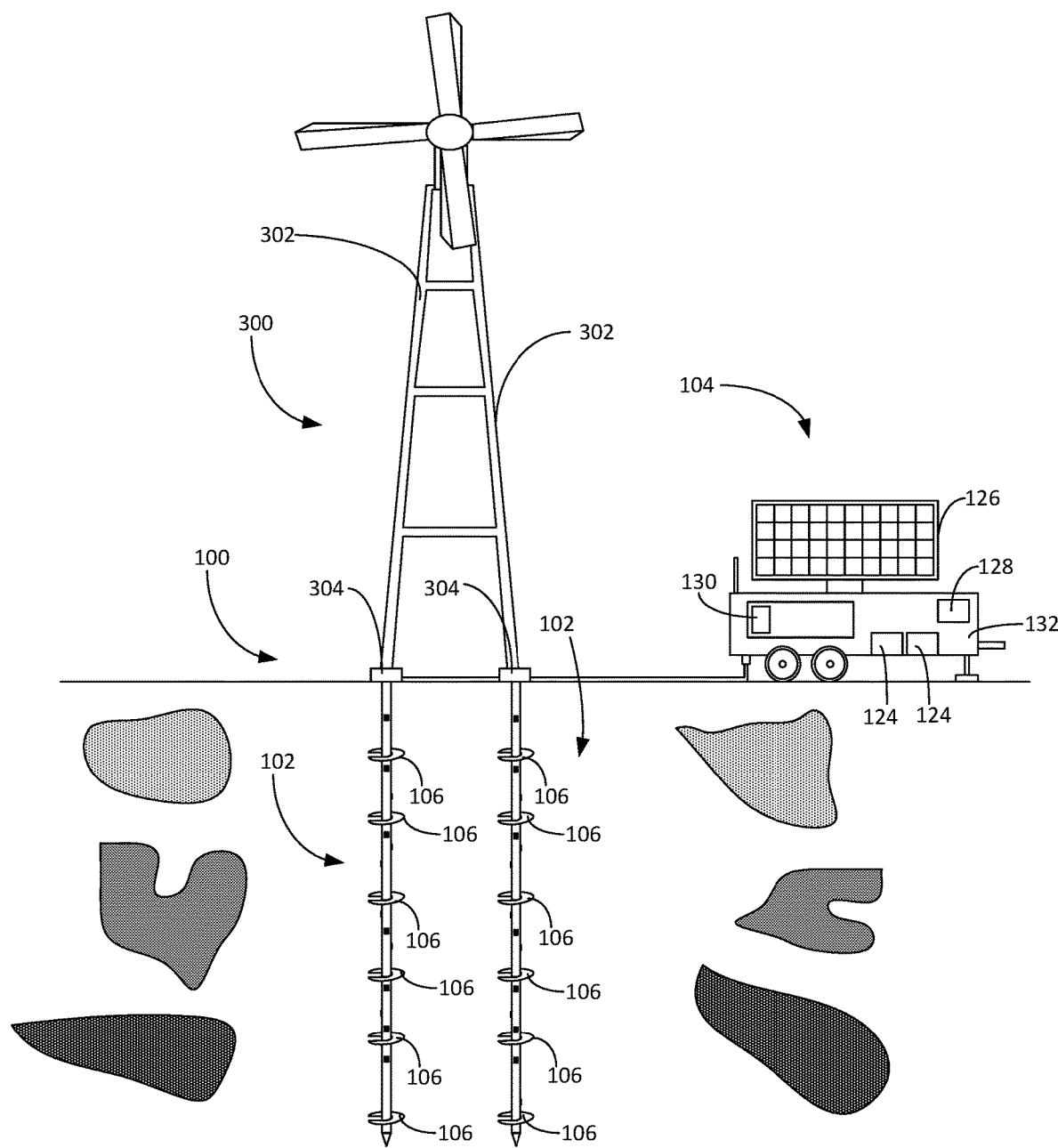
FIG. 6 depicts a self-supported tower constructed in accordance with an exemplary embodiment.

Thus, the present disclosure is directed, in non-limiting embodiments, to a ground pile 100 that is configured to detect and report loading forces imposed on the installed ground pile. Beginning with FIG. 1, shown therein is the ground pile system 100 supporting a structure 200 with guy wires 202. Although the structure 200 is depicted as a small wind-powered electrical generator, it will be appreciated that that the ground pile system 100 can be used to support other towers, derricks, and structures, or to simply evaluate loading forces in a particular location without a connection to a tower or other structure. The ground pile system 100 can be used, for example, with the self-supported tower 300 depicted in FIG. 6 in which legs 302 of the tower 300 are supported by footings 304 that are in turn supported by the ground pile system 100.

The ground pile system 100 includes one or more piles 102 and a data acquisition unit 104. As used herein, the term "pile" refers to any member that is driven into the ground to a desired depth to support a structure, including, but not limited to, piles, anchors, piers and caissons. As depicted in FIG. 1, the two piles 102 are each helical piles that include one or more helical discs 106 that facilitate the installation of the piles 102 into the earth. The piles 102 may be manufactured from steel, concrete or other materials that exhibit favorable response to lateral, torsional and axial loading forces. In some embodiments, the piles 102 are driven into the earth by a rotating head that turns the piles 102 while applying a downward force to encourage advancement of the piles 102 through the soil. Depending on the requirements of a particular application, each pile 102 may be installed at a depth that spans several geologic strata and terminates in bedrock or other substantially static, hard formation. The pile 102 may be designed for compression loading, tension loading, torsional loading or combinations of compression, tension and torsional loadings.

Figures 2, 3:
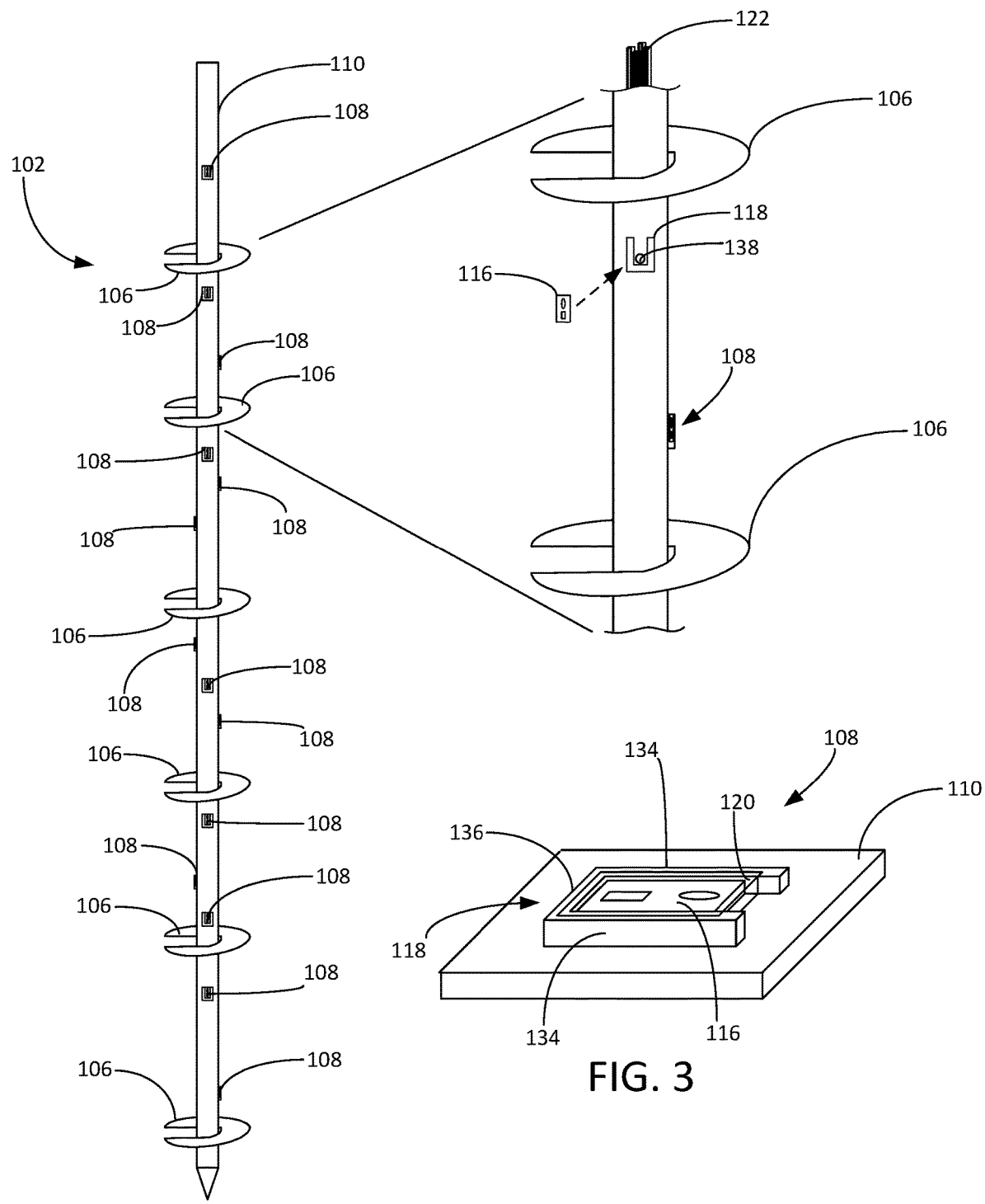
FIG. 2 is a close-up view of the helical pile from FIG. 1.
FIG. 3 is a perspective view of a sensor module from the helical pile of FIG. 2.
Figure 4:
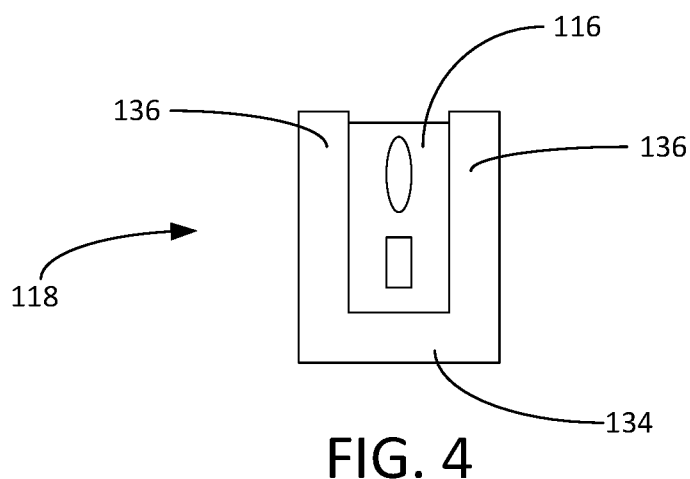
FIG. 4 is a top view of the sensor module from the helical pile of FIG. 2.
Figure 5:
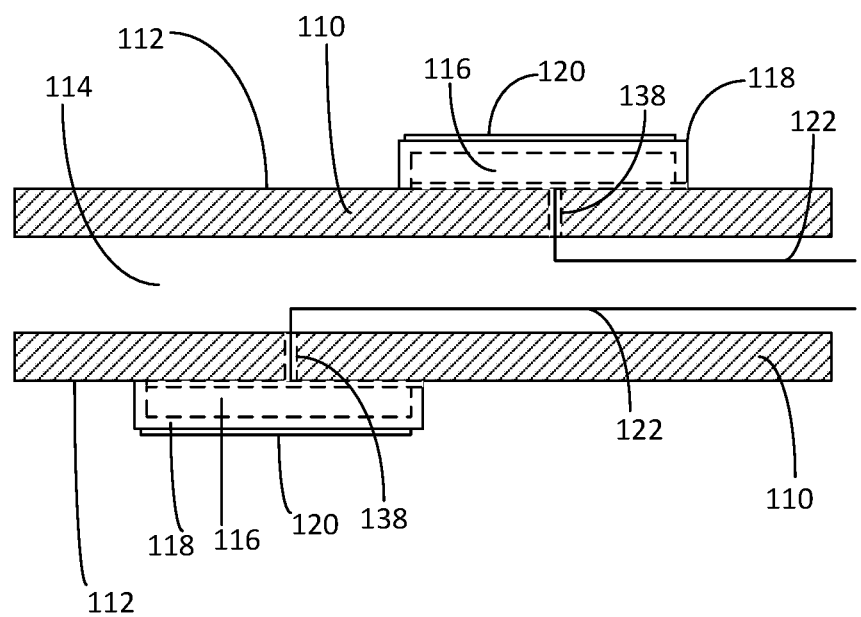
FIG. 5 is a cross-sectional view of a pair of sensor modules installed on the helical pile of FIG. 2.

Turning to FIGS. 2-5, shown therein are various depictions of the pile 102, which further includes one or more sensor modules 108. Each pile 102 includes tubular body 110 that has an exterior surface 112 and a hollow interior 114. The sensor modules 108 are optimally placed on the exterior surface 112 of the ground pile 102. In other embodiments, some or all of the sensor modules 108 are positioned inside the interior 114 of the pile 102. As depicted in FIG. 2, the sensor modules 108 can be distributed around the exterior surface 112 of the tubular body 110 of the pile 102 to provide readings from different sides and depths of the tubular body 110.

The sensor modules 108 include a sensor 116, a guard 118, an exterior seal 120 and sensor wires 122. The sensor 116 may be configured to detect strain, stress, temperature, pressure, moisture, vibration, electrical potential, radiation, acoustics or other measurable information. It will be understood that a particular pile 102 may include a plurality of sensor modules 108 that include a variety of different types of sensors 116. For example, a first sensor 116 may be configured to measure a first condition on the tubular body 110, while a second sensor 116 is configured to measure a second condition on the tubular body 110. The sensors 116 produce a measurement signal that is transferred to the data acquisition unit 104 through the sensor wires 122. As noted in FIG. 5, the sensor wires 122 can be advantageously routed from the sensor 116 to the surface through the interior 114 of the pile 102. In some embodiments, the sensor wires 122 also provide a source of electrical power to the sensors 116. In yet other embodiments, the sensors 116 are powered by a battery (not depicted) on or inside the pile 102. In yet another embodiment, some or all of the sensors 116 transmit measurement signals to the data acquisition unit 104 through a wireless connection.

In many cases, the ground pile system 100 is installed in remote locations that are not connected to an established electrical grid or communications network. The data acquisition unit 104 is configured to receive the measurement signals from the sensors 116 and transmit the acquired data to a remote operation facility for analysis. The data acquisition unit 104 includes one or more batteries 124, solar panel array 126 configured to charge the batteries 124, a computer 128 for receiving and storing the measurement signals and a telecommunications device (modem) 130 for transmitting the acquired data to the remote operations location for further processing. It will be appreciated that the data acquisition unit 104 can also be connected to a wired telephone or data system and that the solar panel array 126 and batteries 124 may not be necessary if the data acquisition unit 104 can be connected to an established electrical grid. The data acquisition unit 104 can be installed on a trailer 132 or other vehicle to facilitate the movement of the data acquisition unit 104 between locations. In exemplary embodiments, the data acquisition unit 104 is configured to receive measurement signals from a number of piles 102 that may be dispersed in an area surrounding the data acquisition unit 104. For example, a single data acquisition unit 104 can be configured to receive and report measurement signals from multiple piles 102 that support a plurality of structures 200 within a wind farm.

Notably, the sensors 116 are secured to the piles 102 in a manner that minimizes the risk of damage to the sensors 116 during the installation of the piles 102. The sensor 116 is affixed to the exterior surface 112 of the pile 102 with a suitable epoxy or other adhesive within the sensor guard 118. In the exemplary embodiments depicted in FIGS. 2-5, each sensor guard 118 is configured as a "U-shaped" or box-shaped element that has a pair of legs 134 and one or more cross members 136. The legs 134 and cross member 136 each have a height ("H") from the exterior surface 112 that is greater than the thickness of the sensor 116. In this way, the sensor 116 nests within the sensor guard 118 in a recessed position below the upper surface of the sensor guard 118. The sensor guards 118 are oriented on the exterior surface 112 of the tubular body 110 such that the cross member 136 and legs 134 shield the sensor 116 from contact with soil or rocks as the pile 102 is advanced into the ground. Thus, the cross member 136 should be oriented below the sensor 116 on the tubular body 110 of the pile 102.

In some embodiments, the sensor guard 118 is constructed by welding a "berm" on the exterior surface 112 that is taller than the thickness of the sensor 116. In other embodiments, the sensor guard 118 is constructed from a bracket that is secured to the tubular body 110 with fasteners, welding or adhesives. A line port 138 located within the perimeter of the sensor guard 118 can be drilled through the tubular body 110 to permit the passage of the sensor wires 122 from the sensor 116. As noted above, the sensor wires 122 from the various sensors 116 on a particular pile 102 can be routed through the interior 114 of the pile 102 to a wiring harness on the surface.

Once the sensor 116 is affixed to the tubular body 110 in a recessed position within the sensor guard 118 and the sensor wires 122 have been correctly routed through the line port 138, the exterior seal 120 can be applied over the top of the sensor guard 118 and sensor 116. The exterior seal 120 is a pourable or paintable epoxy that creates a waterproof and contaminant proof barrier over the sensor 116.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be at least ±20%, or at least ±10%, or at least ±5% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded. The range 0.5 mm to 10 mm is to be understood to include all integers within the range and decimal fractions within the range (e.g., 1, 2, 3, 4, 5, 6, 7, 8, 9, and 0.6, 0.7, 0.8, 0.9, 1.1, 1.2, 1.3, 1.4, 1.5, 1.6, 1.7, 1.8, 1.9, and 0.51, 0.52, 0.53, 0.54, 0.55, 0.56, 0.57, 0.58, 0.59, and so on).

Thus, the embodiments of the present disclosure are well adapted to carry out the objects and attain the ends and advantages mentioned above as well as those inherent therein. While the inventive device and system have been described and illustrated herein by reference to particular non-limiting embodiments in relation to the drawings attached thereto, various changes and further modifications, apart from those shown or suggested herein, may be made therein by those of ordinary skill in the art, without departing from the spirit of the inventive concepts.

What is claimed is:

1. A pile for use in a ground pile system, the pile comprising:
    a tubular body having an exterior surface;
    a plurality of helical discs attached to the tubular body; and
    one or more sensor modules attached to the exterior surface of the tubular body, wherein each of the one of more sensor modules comprises:
        a sensor guard that has a perimeter extending away from the exterior surface, the sensor guard comprising:
            one or more cross members attached to the exterior surface of the tubular body; and
            a plurality of legs connected to the one or more cross members; and
        a sensor nested within the sensor guard, wherein the sensor is recessed within the perimeter of the sensor guard, such that when the pile is in a vertical orientation, the sensor is located above at least one of the one or more cross members.

2. The pile of claim 1, wherein the sensor module further comprises an exterior seal that covers the sensor within the sensor guard.

3. The pile of claim 1, wherein the sensor guard comprises a welded berm on the tubular body.

4. The pile of claim 3, wherein the sensor module further comprises a line port extending through the tubular body.

5. A ground pile system for use in stabilizing a tower, the ground pile system comprising:
    a data acquisition unit; and
    a pile supporting the tower, wherein the pile comprises:
        a tubular body having an exterior surface;
        a plurality of helical discs attached to the tubular body; and
        one or more sensor modules attached to the exterior surface of the tubular body, wherein each of the one of more sensor modules comprises:
            a sensor guard extending outward from the exterior surface, the sensor guard comprising:
                one or more cross members attached to the exterior surface of the tubular body; and
                a plurality of legs connected to the one or more cross members; and
            a sensor nested within the sensor guard, wherein the sensor is recessed within a perimeter of the sensor guard, such that when the pile is in a vertical orientation, the sensor is located above at least one of the one or more cross members.

6. The ground pile system of claim 5, wherein the sensor module further comprises an exterior seal that covers the sensor.

7. The ground pile system of claim 5, wherein the sensor guard comprises a welded berm on the tubular body.

8. The ground pile system of claim 7, wherein the sensor module further comprises a line port extending through the tubular body.

9. The ground pile system of claim 5, wherein the data acquisition unit comprises:
    a solar panel array;
    a battery charged by the solar panel array;
    a modem powered by the battery; and
    a computer powered by the battery, wherein the computer is configured to receive signals from the sensors and transmit the signals to a remote operation center through the modem.

10. A system for detecting loads imposed on a ground pile system configurable for supporting or stabilizing a tower or other structure, the system comprising:
    a ground pile, wherein the ground pile comprises:
        a tubular body having an exterior surface;
        a plurality of helical discs attached to the tubular body; and
        one or more sensor modules attached to the exterior surface of the tubular body; and
        wherein each of the one of more sensor modules comprises:
            a sensor guard extending outward from the exterior surface, the sensor guard comprising:
                one or more cross members attached to the exterior surface of the tubular body; and
                a plurality of legs connected to the one or more cross members; and
            a sensor nested within the sensor guard, such that when the pile is in a vertical orientation, the sensor is located above at least one of the one or more cross members; and
    a data acquisition unit, wherein the data acquisition unit is configured to receive signals from the sensors and transmit the signals to a remote operation center.

11. The system of claim 10, wherein the data acquisition unit comprises:
    a modem; and
    a computer configured to process the signals received from the sensors.

12. The system of claim 11, wherein the data acquisition unit comprises:
    a solar panel array; and
    a battery charged by the solar panel array, wherein the modem and computer are powered by the battery.

13. The system of claim 10, wherein the one or more sensor modules comprise:
    a first sensor configured to measure a first condition affecting the tubular body; and
    a second sensor configured to measure a second condition affecting the tubular body.

14. The system of claim 10, wherein the sensor is selected from the group consisting of strain sensors, stress sensors, temperature sensors, pressure sensors, moisture sensors, vibration sensors, electrical potential sensors, radiation sensors, and acoustic sensors.

15. The system of claim 10, wherein the sensor is a strain sensor configured to measure lateral strain applied to the tubular body.

16. The system of claim 10, wherein the sensor is a strain sensor configured to measure longitudinal strain applied to the tubular body.

* * * * *